UNITED STATES PATENT OFFICE 2,057,063

AZO DYES AND THEIR PRODUCTION

Wilfred Archibald Sexton, Blackley, Manchester, England, assignor to Imperial Chemical Industries Limited, a corporation of Great Britain No Drawing. Application January 22, 1935, Serial No. 2,958. In Great Britain January 17, 1934

13 Claims. (Cl. 260—93)

It has been found that compounds of the general formula,

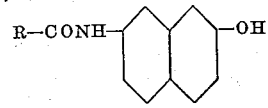

where R is an aromatic group void of solubilizing groups, when dissolved in alkaline solution, preferably sodium hydroxide solution, have good affinity for cotton, and cotton which has been steeped in such solutions may be developed by immersion in a diazo solution in the same way as for naphthol AS (2,3-hydro-xynaphthoic anilide) dyeings.

Of the compounds only the 7-benzoylamino-2-naphthol appears to have been described. This substance, and the new analogous compounds described below possess an important advantage over naphthol AS however, in that a much wider range of shade is produced by their means. It is possible to produce from one of them, by suitable choice of diazo component, a range of shades including yellow, orange, red, violet, blue and brown. The dyeings have good fastness properties, for example to soaping and to chlorine.

Accordingly, the invention comprises a process for the production of azo dyes on the fibre by impregnating the fibre with a 7-aroylamino-2-naphthol and afterwards treating it with a diazo compound.

The following examples, in which parts are by weight, illustrate but do not limit the invention.

*Example 1.*—7 parts of 7-benzoylamino-2-naphthol (Raiford and Talbot, J. American Chem. Soc., 1927, 49,561) are pasted with 9 parts of Turkey red oil and 14 parts of caustic soda (62° Tw.). The paste is dissolved by adding 140 parts of boiling water and the clear solution is made up to 1000 parts by adding water.

1 part of cotton is steeped in 20 parts of this solution at 25–30° C. for half an hour. The cotton is squeezed to remove adhering liquor and immersed in a diazo bath in the usual manner. After dyeing it is boiled for half an hour in a bath containing 3 parts of soap and 2 parts of sodium carbonate per 1000 parts of water.

The following table gives a list of the shades obtained with different diazotized amines.

| Amine | Shade |
|---|---|
| 2, 5-dichloroaniline | Golden orange. |
| o-chloroaniline | Do. |
| 5-chloro-2-toluidine | Orange. |
| 4-chloro-2-anisidine | Reddish-orange. |
| 2-aminoanthraquinone | Dull yellowish-red. |
| 5-nitro-2-anisidine | Bluish-red. |
| 4-benzoylamino-2, 5-diethoxyaniline | Bordeaux. |
| 4-amino-4'-methoxydiphenylamine | Corinth-brown. |
| o-Phenetole-azo-α-naphthylamine | Navy-blue. |

The dyeings have good fastness properties e. g. to soaping and to chlorine.

*Example 2.*—3 parts of 7-β-naphthoylamino-2-naphthol (which may be made by the action of β-naphthoyl chloride on 2,7-aminonaphthol, and which melts at 240–241° C.) are pasted with 7 parts of Turkey red oil and 14 parts of caustic soda (62° Tw.). The paste is dissolved by adding 150 parts of boiling water and the solution is made up to 1000 parts by adding cold water. 20 parts of sodium chloride are dissolved in the solution. Cotton padded as in Example 1 and developed with diazotized amines gives fast shades as indicated below.

| Amine | Shade |
|---|---|
| o-Chloroaniline | Golden orange. |
| 2, 5-dichloroaniline | Do. |
| 4-nitro-2-toluidine | Orange. |
| 5-chloro-2-toluidine | Reddish-orange. |
| 4-nitro-2-anisidine | Do. |
| 4-chloro-2-anisidine | Scarlet. |
| 5-nitro-2-toluidine | Yellowish-red. |
| 4-chloro-2-nitroaniline | Do. |
| 5-nitro-2-anisidine | Bright bluish-red. |
| 5-methyl-4-benzoylamino-2-methoxyaniline | Claret. |
| 2-chloro-4-benzoylamino-5-methoxyaniline | Brick-red. |
| 4-amino-4'-methoxydiphenylamine | Chocolate-brown. |
| Dianisidine | Dull reddish-blue. |

I claim:
1. The process which comprises coupling a diazotized primary arylamine without water solubilizing substituents to the naphthol nucleus of a 7-benzoylamino-2-naphthol incapable of coupling in the aroyl nucleus and free from water solubilizing substituents.

2. The process which comprises coupling a diazotized primary arylamine of the benzene series without water solubilizing substituents to the naphthol nucleus of a 7-aroylamino-2-naphthalene incapable of coupling in the aroyl nucleus and free from water solubilizing substituents.

3. The process which comprises coupling a diazotized primary arylamine of the benzene series without water solubilizing substituents to the naphthol nucleus of a 7-benzoylamino-2-naphthol.

4. The process which comprises coupling diazotized 2,5-dichloraniline to the naphthol nucleus of 7-benzoylamino-2-naphthol.

5. The process which comprises coupling diazotized 5-nitro-2-anisidine to the naphthol nucleus of 7-benzoylamino-2-naphthol.

6. The process which comprises coupling diazotized 4-amino-4-methoxydiphenylamine to the naphthol nucleus of 7-benzoylamino-2-naphthol.

7. A dyestuff having the formula

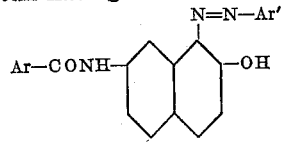

in which Ar and Ar' are aryl groups free from water solubilizing substituents and Ar is without azo substituents.

8. A product represented by the formula

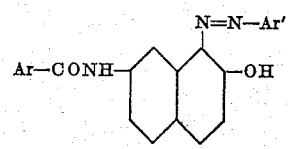

in which Ar and Ar' are aryl groups free from water solubilizing substituents and Ar is without azo substituents and is of the benzene series.

9. A product represented by the formula

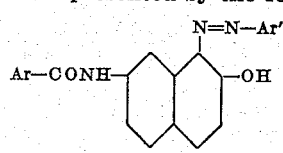

in which Ar and Ar' are aryl groups free from water solubilizing substituents and Ar is without azo substituents and is of the naphthalene series.

10. A compound represented by the formula

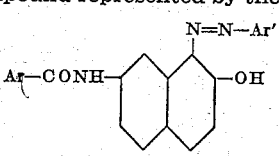

in which Ar and Ar' are aryl groups free from water solubilizing substituents, Ar is without azo substituents and is of the benzene series and Ar' is of the benzene series.

11. A compound represented by the formula

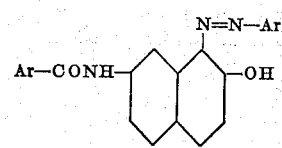

in which Ar is an aryl nucleus of the benzene series and Ar' is the radical of diazotized 2,5-dichloraniline.

12. A compound represented by the formula

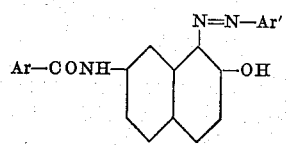

in which Ar is an aryl nucleus of the benzene series and Ar' is the radical of diazotized 5-nitro-2-anisidine.

13. A compound represented by the formula

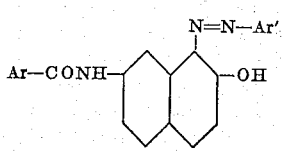

in which Ar is an aryl nucleus of the benzene series and Ar' is the radical of diazotized 4-amino-4-methoxydiphenylamine.

WILFRED ARCHIBALD SEXTON.